(12) United States Patent
Magee

(10) Patent No.: US 7,681,852 B2
(45) Date of Patent: Mar. 23, 2010

(54) VEHICLE CUP AND PLATE HOLDERS

(76) Inventor: Charles Magee, 175 Smith Rd., Cairo, GA (US) 39828

( * ) Notice: Subject to any disclaimer, the term of this patent is extended or adjusted under 35 U.S.C. 154(b) by 71 days.

(21) Appl. No.: 12/017,862

(22) Filed: Jan. 22, 2008

(65) Prior Publication Data

US 2008/0173567 A1  Jul. 24, 2008

Related U.S. Application Data

(60) Provisional application No. 60/881,660, filed on Jan. 22, 2007.

(51) Int. Cl.
*A47K 1/08* (2006.01)

(52) U.S. Cl. .............. 248/311.2; 206/562; 224/926; 297/135; 297/188.01

(58) Field of Classification Search ............. 248/311.2; 224/483, 926; 220/23.86; 206/503, 514, 206/562; 297/135, 145, 188.01, 188.18, 297/188.2

See application file for complete search history.

(56) References Cited

U.S. PATENT DOCUMENTS

| | | | |
|---|---|---|---|
| 523,068 | A | 7/1894 | Gaul |
| 1,167,934 | A | 1/1916 | Roth |
| 1,258,792 | A | 3/1918 | Lorimer |
| 1,468,256 | A | 9/1923 | Blackman et al. |
| 1,579,978 | A | 4/1926 | Vincia |
| D87,063 | S | 5/1932 | Jackson |
| 2,014,745 | A | 9/1935 | Regli |
| D97,342 | S | 10/1935 | Bloem |
| 2,029,535 | A | 2/1936 | Langel |
| 2,061,285 | A | 11/1936 | McCormick |
| 2,080,865 | A | 5/1937 | Lassiter |
| 2,278,390 | A | 3/1942 | Havlis |
| 2,295,860 | A | 11/1942 | Oliver |
| 2,302,446 | A | 11/1942 | Kincaid |
| 2,354,968 | A | 8/1944 | Pickering |
| D149,335 | S | 4/1948 | Beatty |
| 2,510,591 | A | 6/1950 | Listman |
| 2,720,189 | A | 10/1955 | Newman |
| D179,658 | S | 2/1957 | Scelzo, Jr. |
| 2,916,180 | A | 12/1959 | Alger |
| 2,967,622 | A | 1/1961 | Poglein et al. |

(Continued)

FOREIGN PATENT DOCUMENTS

BE    494469    7/1950

(Continued)

OTHER PUBLICATIONS

Home Furn. Daily, Nov. 3, 1986, p. 123, clock at bottom right.

(Continued)

*Primary Examiner*—Ramon O Ramirez
(74) *Attorney, Agent, or Firm*—Kilpatrick Stockton LLP

(57) ABSTRACT

A system of multifunctional food and beverage holders for use in motor vehicles and other locations. The components of this system facilitate safe, convenient and flexible handling of food and beverages in automobiles and other vehicles utilizing tray/plates for holding food that can attach to a handle, rest on a flat surface or be secured in the vehicle by attachment to a cup holder adaptor that can be temporarily locked in a vehicle cup holder.

11 Claims, 20 Drawing Sheets

U.S. PATENT DOCUMENTS

| | | | |
|---|---|---|---|
| D193,456 S | 8/1962 | Bellar | |
| 3,142,425 A | 7/1964 | Cobb | |
| 3,164,257 A | 1/1965 | Foy | |
| D202,080 S | 8/1965 | Knaust | |
| D227,851 S | 7/1973 | Nowland et al. | |
| 3,768,710 A | 10/1973 | Eggers | |
| 3,814,367 A | 6/1974 | Rasmussen | |
| 4,011,951 A | 3/1977 | Boyer | |
| 4,033,489 A | 7/1977 | Fowler | |
| 4,516,685 A | 5/1985 | French | |
| 4,570,793 A | 2/1986 | O'Neil et al. | |
| 4,607,758 A | 8/1986 | Stevens | |
| 4,744,597 A | 5/1988 | Bauman et al. | |
| D315,685 S | 3/1991 | Kato | |
| D319,023 S | 8/1991 | Kato et al. | |
| 5,062,674 A | 11/1991 | Magee | |
| D324,180 S | 2/1992 | Tamura | |
| 5,104,168 A | 4/1992 | Magee | |
| D325,933 S | 5/1992 | Torgison | |
| D353,104 S | 12/1994 | Moore | |
| D363,230 S | 10/1995 | Moore | |
| D395,009 S | 6/1998 | Magee | |
| 5,915,561 A * | 6/1999 | Lorenzana et al. | 206/562 |
| D446,247 S | 8/2001 | Martorella | |
| 6,311,841 B1 * | 11/2001 | Hodges | 206/541 |
| 6,651,836 B1 * | 11/2003 | Hofheins et al. | 220/575 |
| 6,732,990 B2 * | 5/2004 | Hudson | 248/311.2 |
| 2003/0141424 A1 * | 7/2003 | Thomas | 248/311.2 |
| 2004/0094587 A1 * | 5/2004 | Harden et al. | 224/275 |
| 2006/0283754 A1 * | 12/2006 | Schiltz et al. | 206/503 |
| 2006/0284041 A1 * | 12/2006 | Segretto | 248/311.2 |
| 2008/0202977 A1 * | 8/2008 | Knudsen et al. | 206/561 |
| 2008/0217206 A1 * | 9/2008 | Shen | 206/562 |

FOREIGN PATENT DOCUMENTS

| | | |
|---|---|---|
| CH | 137982 | 2/1930 |
| DE | 920814 | 12/1954 |
| FR | 706847 | 6/1931 |

OTHER PUBLICATIONS

European Jeweler (G.Z.), Jul. 1987, p. 41, clock at bottom center.

* cited by examiner

VEHICLE CUP AND PLATE HOLDERS

CROSS REFERENCE TO RELATED APPLICATION

This application claims priority to and incorporates by reference provisional patent application Ser. No. 60/881,660 filed Jan. 22, 2007.

FIELD OF THE INVENTION

This invention related to cup holders and food trays, particularly including such devices used in motor vehicles.

BACKGROUND OF THE INVENTION

Trays for holding food, beverages, condiments and the like in or on motor vehicles have long been used. Such prior devices do not provide all desirable functionality and are not well adapted for use in current motor vehicles.

SUMMARY OF THE INVENTION

This invention is a system of multifunctional food and beverage holders for use in motor vehicles and other locations. The components of this system facilitate safe and convenient handling of food and beverages in automobiles and other vehicles.

DETAILED DESCRIPTION

Figure 1:
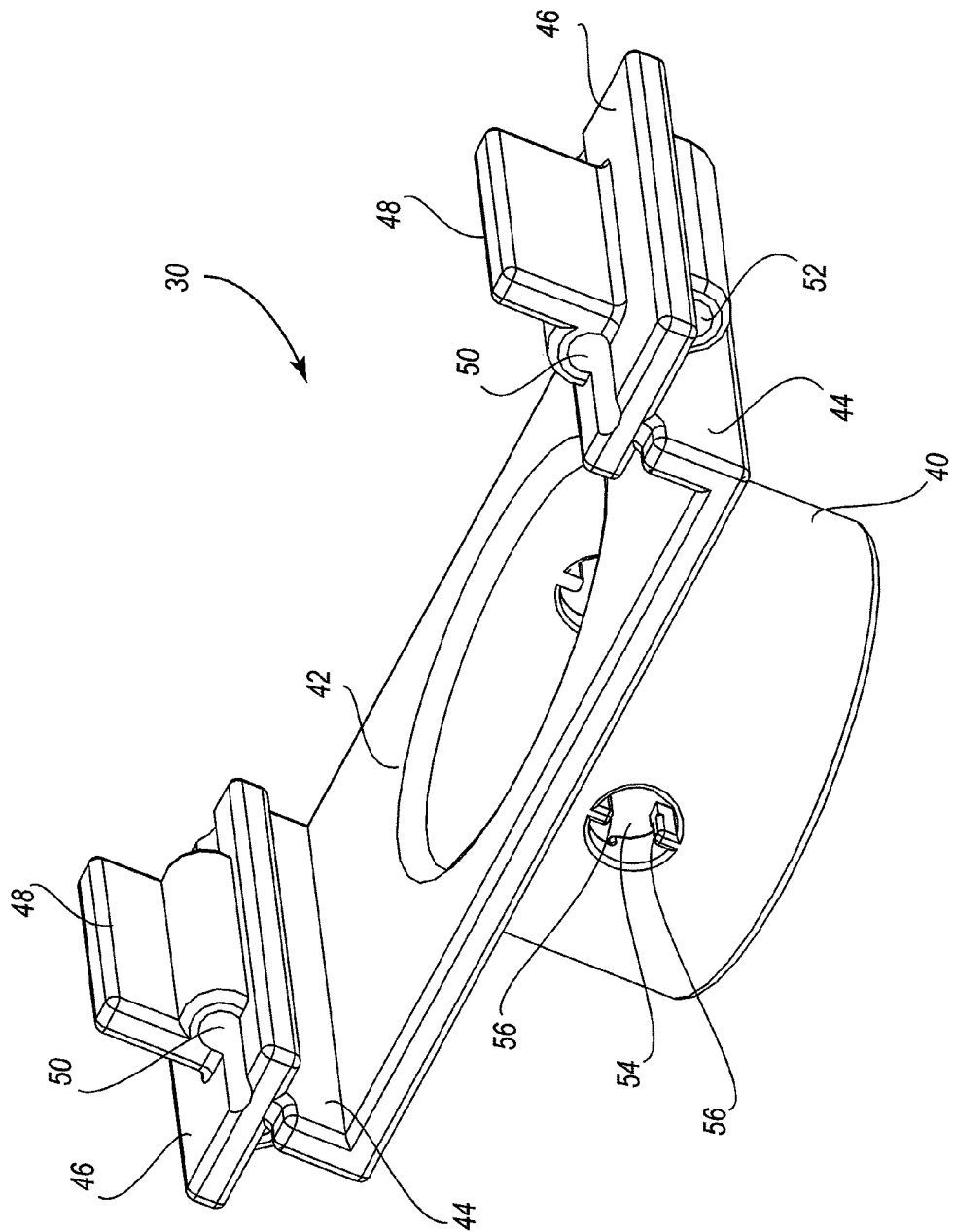
FIG. 1 is a perspective view of one embodiment of a cup holder adaptor of this invention.

The first embodiment of the cup holder adaptor 30 of this invention, depicted in FIG. 1, comprises generally a cup holder sleeve 40 attached to a platform 42 in the form of generally rectangular plate penetrated by a central hole and supporting, at each of two ends, an upright 44 attached to a tray support 46 from which there protrudes an upstanding tab 48. A horizontal upper bore 50 penetrates the base of tab 48 and a portion of tray support 46, and a lower horizontal bore 52 is positioned in a boss on the lower side of tray support 46. Opposite sides of cup holder sleeve 40 are penetrated by a generally round turn buckle-receiving opening 54. There are two opposed protrusions 56 within each turn buckle receiving opening 54.

Figure 2:
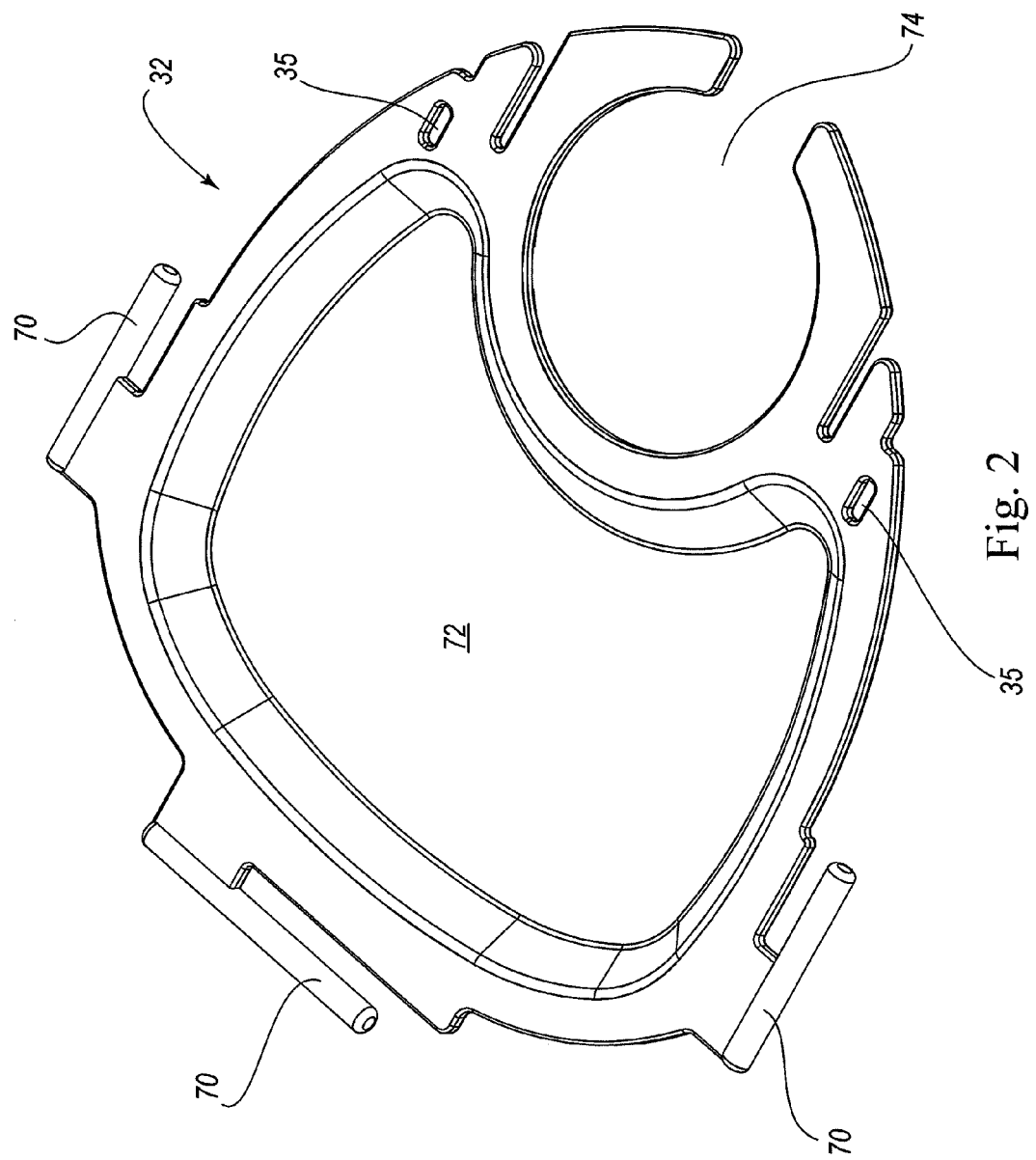
FIG. 2 is a first embodiment of a tray/plate of this invention.

A first embodiment of a tray/plate 32 of this invention is depicted in FIG. 2. The generally planar tray/plate 32 has a large recess 72 for receiving food adjacent to a circular cup receiving opening 74. Pins 70 protrude generally co-planar with the top of tray/plate 32 and may be used, as will be appreciated by reference to the figures, by insertion of one of the pins 70 into one of the above-described upper bore 50 or lower bore 52 in cup holder adaptor 30.

Figure 3:
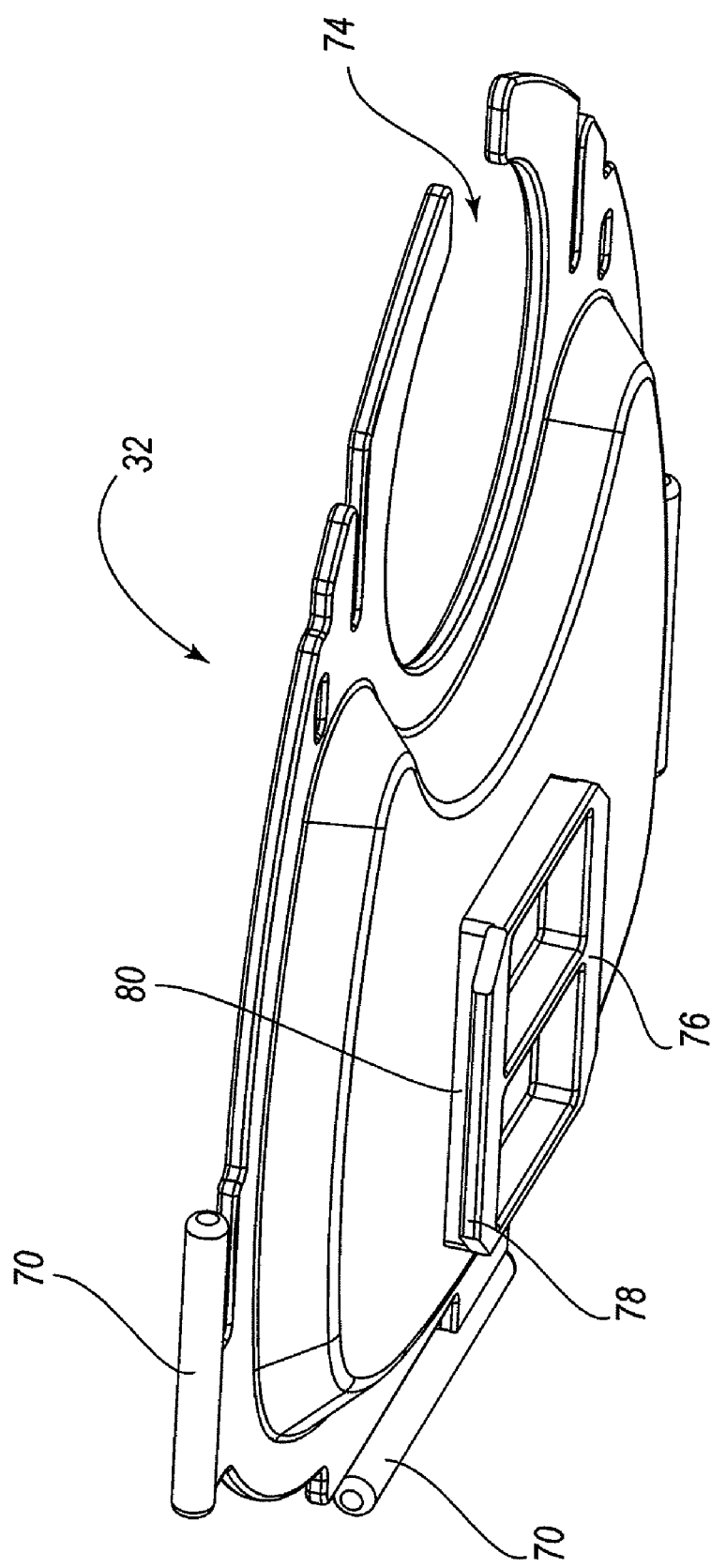
FIG. 3 is a bottom perspective view of the tray/plate shown in FIG. 2.

FIG. 3 depicts the underside of tray/plate 32 and makes it possible to see the handle engaging rail 78 and handle receiving groove 80 adapted to cooperate with the handle 38 described below.

Figure 4:
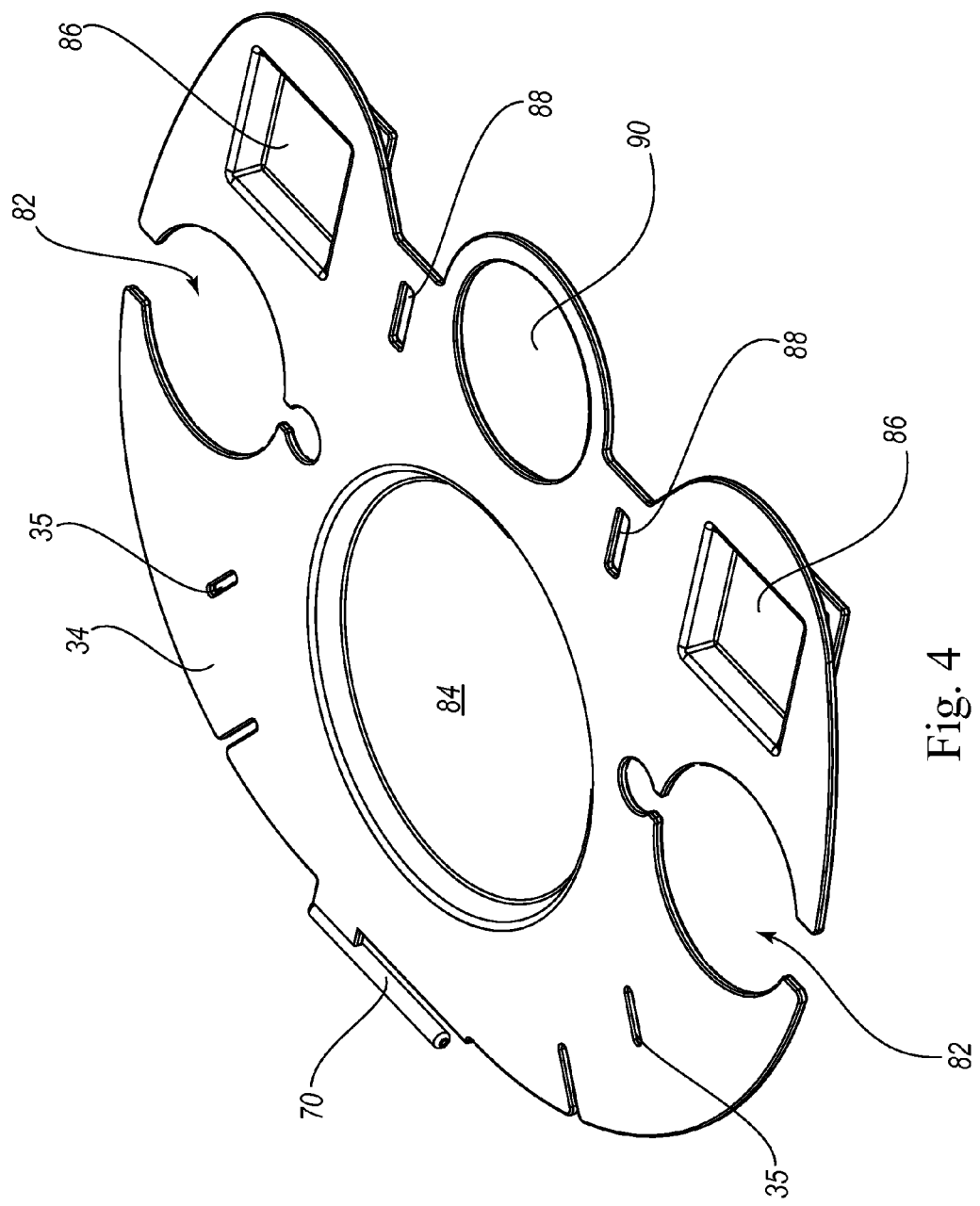
FIG. 4 is a perspective view of the top of a second embodiment of a tray/plate of this invention.
Figure 17:
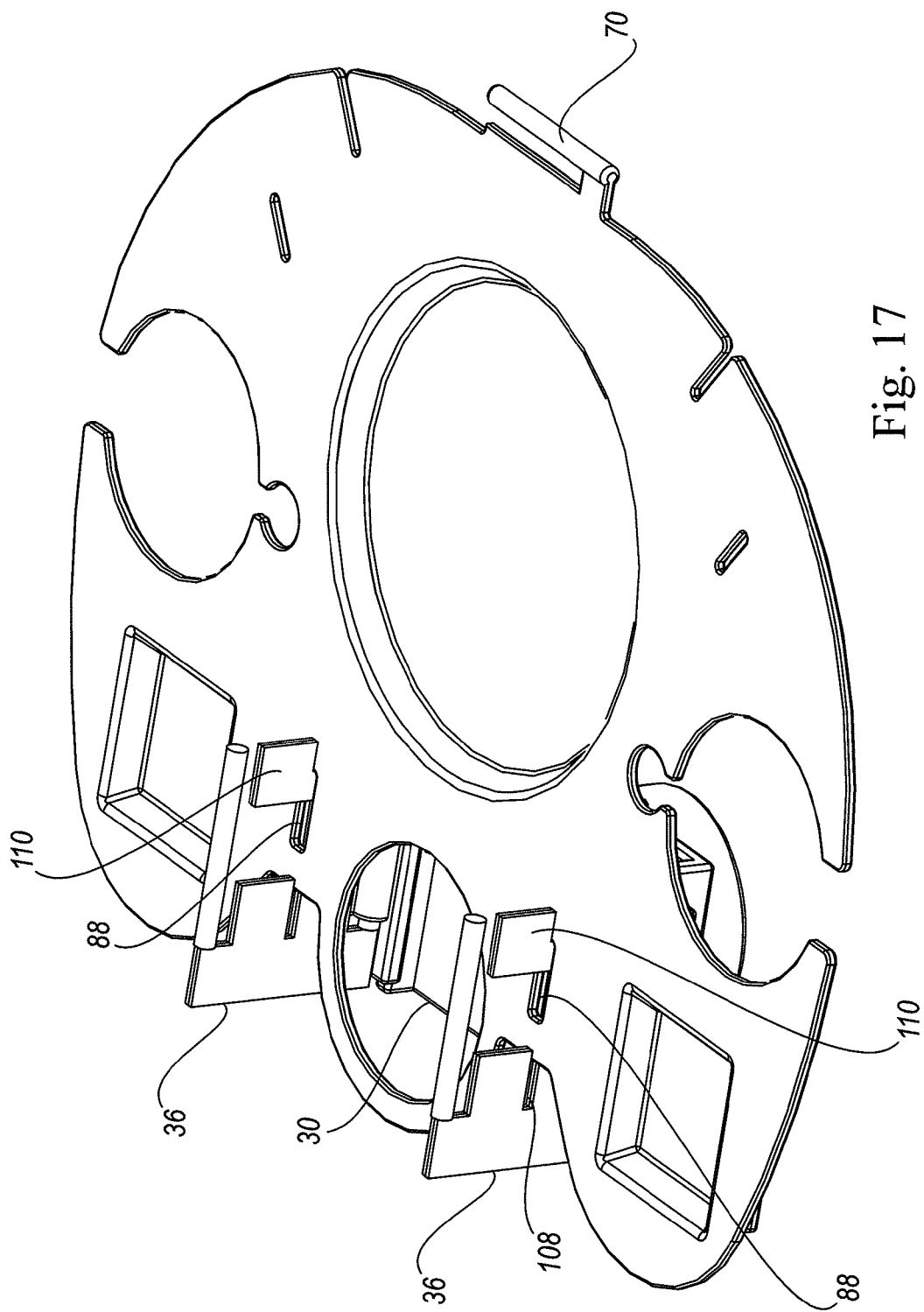
FIG. 17 is a top perspective view of the second embodiment of the tray/plate of this invention shown attached to the cup holder adaptor embodiment of FIG. 1 with support walls as of the type depicted in FIG. 7.
Figure 18:
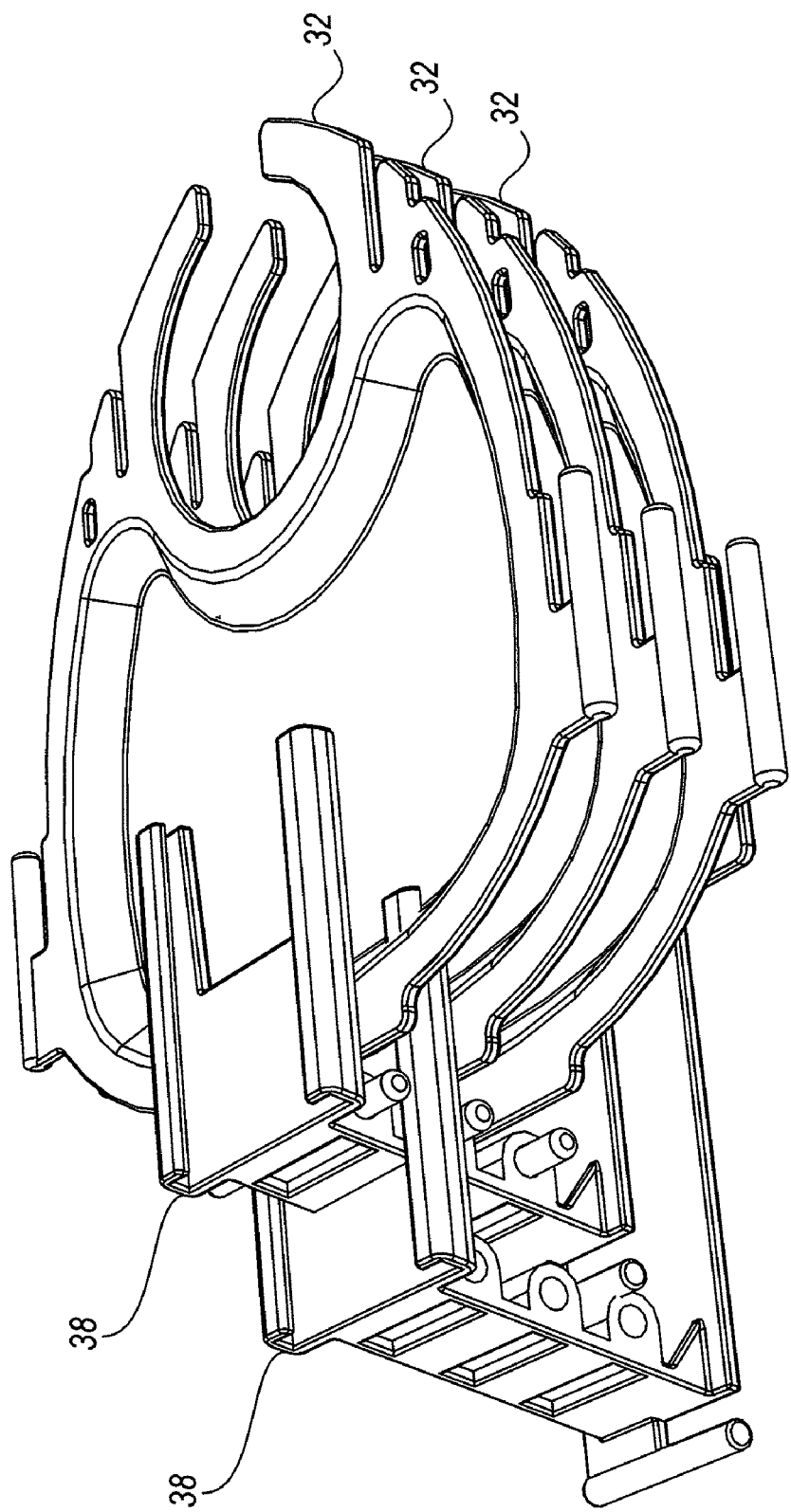
FIG. 18 depicts multiple support handles and the first embodiment of the tray/plate of this invention nested together.
Figure 19:
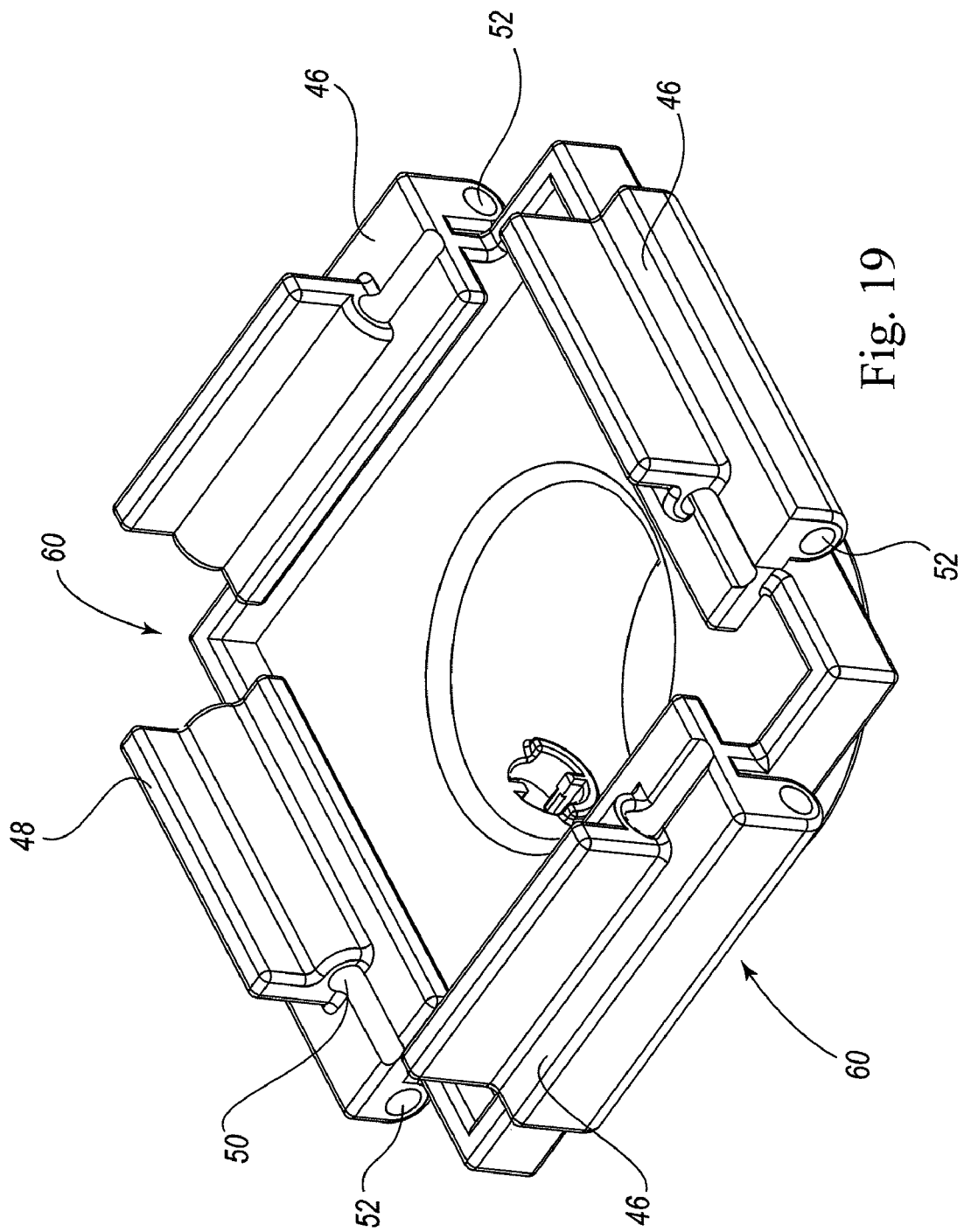
FIG. 19 is a perspective view of a second embodiment of a cup holder adaptor of this invention.

FIG. 4 illustrates an alternative tray/plate 34 of this invention. Tray/plate 34 is generally planar with protruding components as described below. A large circular recess 82 receives food or a plate or other container containing food, and a relatively large circular cup opening 84 provide a location for a beverage cup. Two smaller condiment recesses 86 receive condiments, and a small round condiment cup opening 90 can receive a cup of ketchup or another food condiment or item such as mustard, barbecue sauce or cheese dip. A pin 70 in tray/plate 34 serves the same function as pins 70 in tray/plate 32, and tab receiving slots 88 receive tab 110 of support walls 36 as depicted in FIG. 17.

Slots 35 in the tray/plates 32 and 34 can receive and retain eating utensils.

Figure 5:
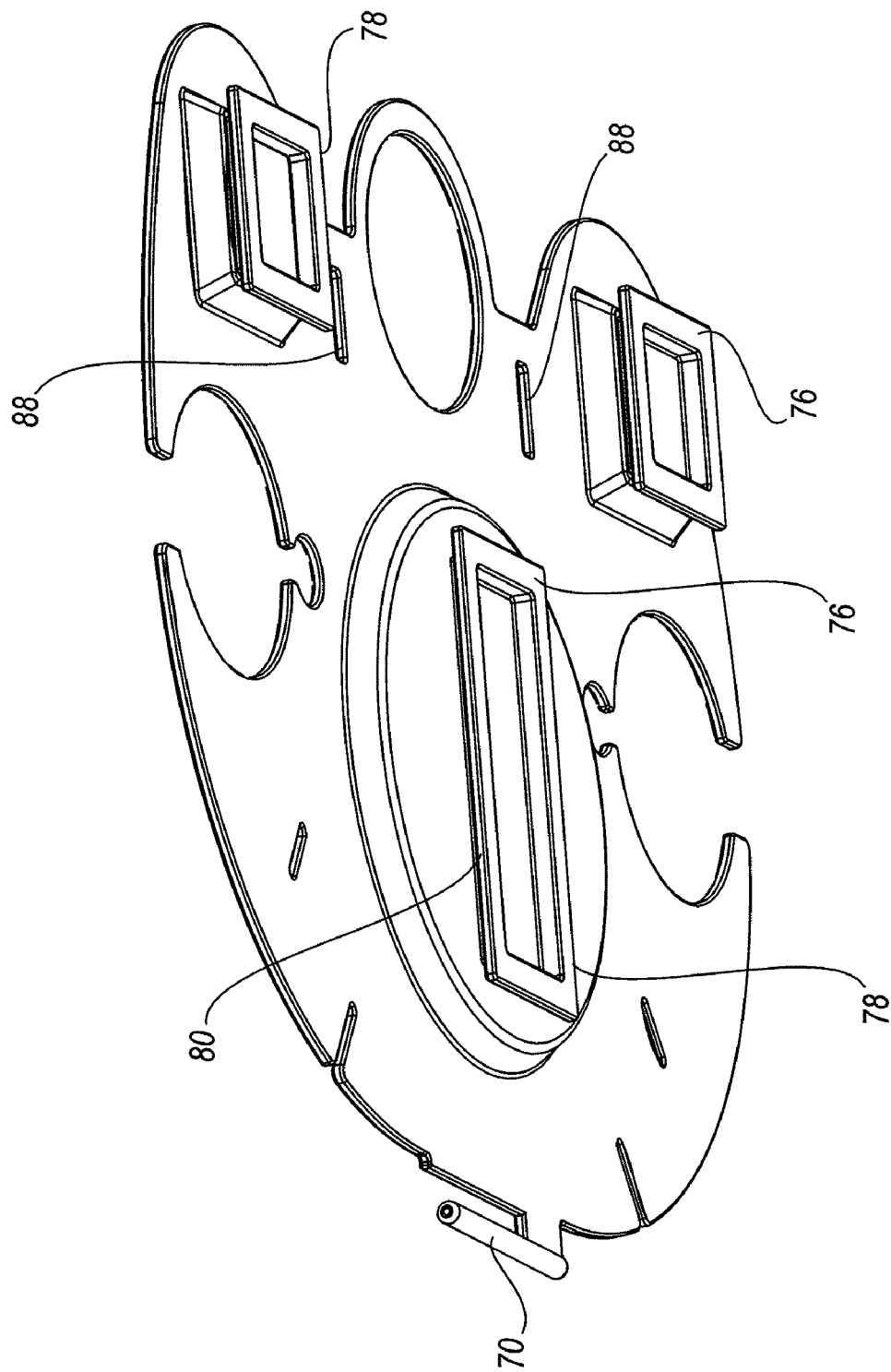
FIG. 5 is a bottom perspective view of the tray/plate shown in FIG. 4.

FIG. 5 shows the underside of tray/plate 34 and makes it possible to see supports 76 under the condiment recesses 86 and recess 82. Handle engaging rail 78 are part of an attachment structure of support 76 and are positioned below handle 38 receiving grooves 80 that receive the handle 38 as described below.

Figure 6:
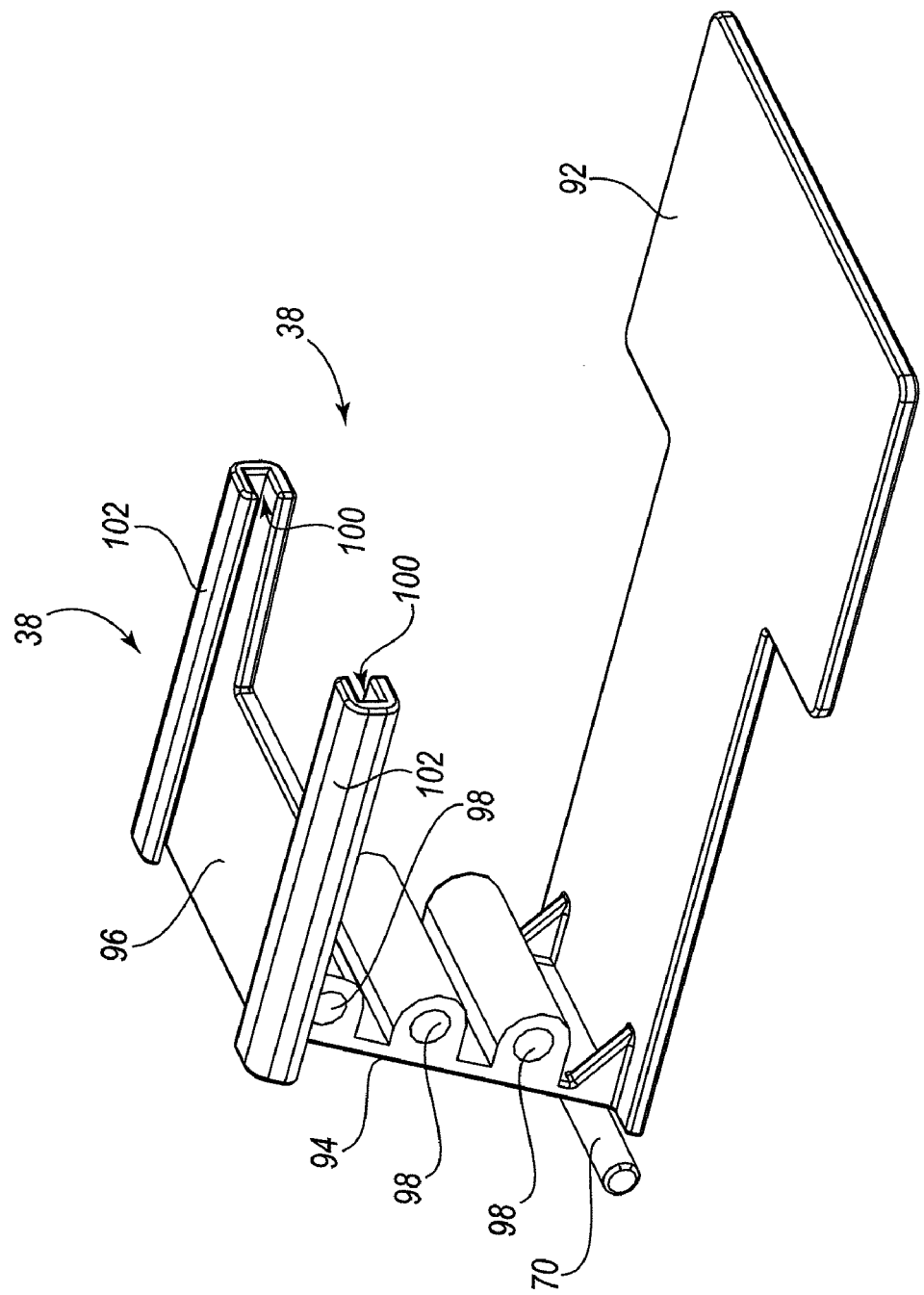
FIG. 6 is a perspective view of a support handle for the tray/plates of this invention.
Figure 7:
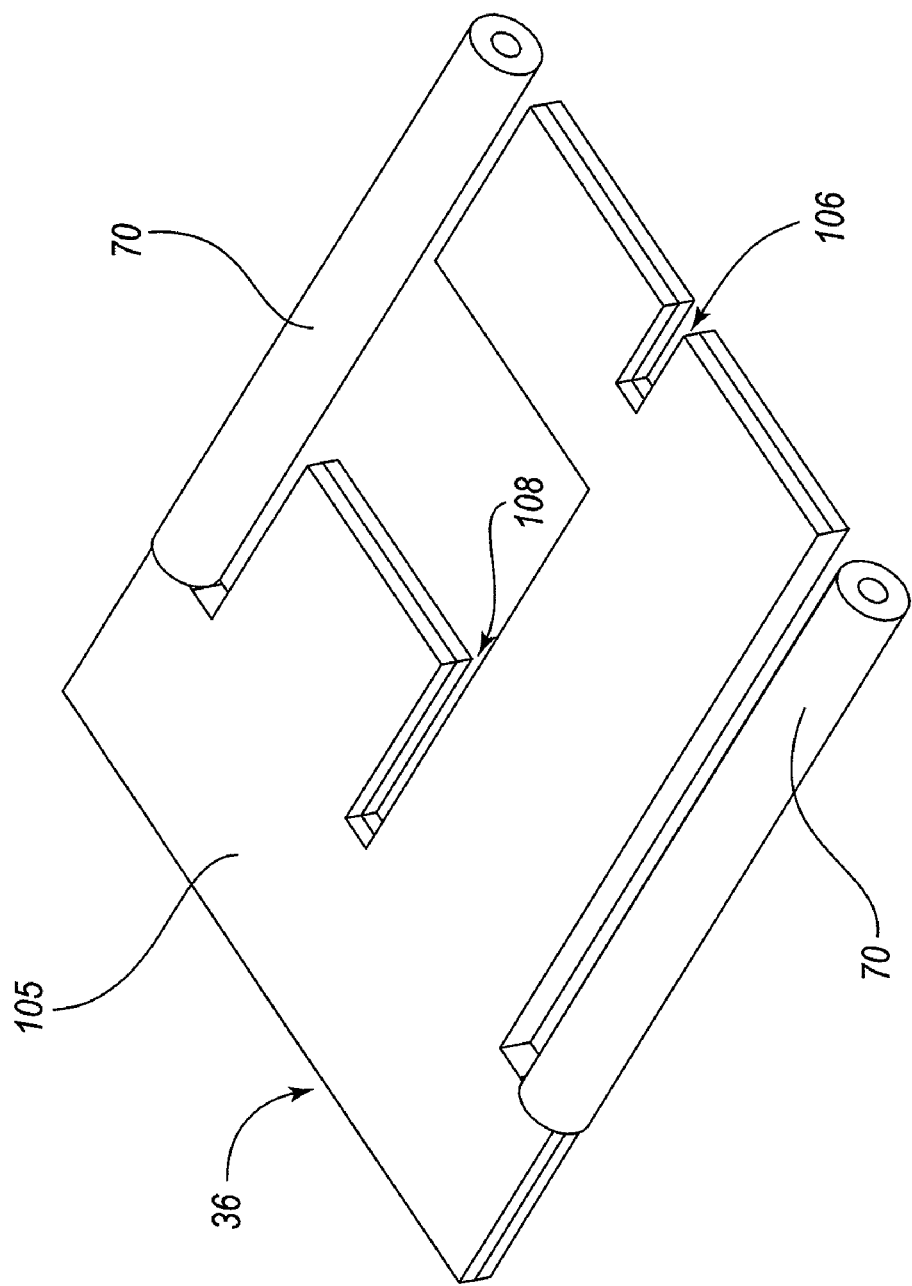
FIG. 7 is a perspective view of a support wall for a cup holder adaptor of this invention.

FIG. 6 is a perspective view of such a support handle 38 that comprises generally a planar base 92 to which there is attached a riser 94 that supports a platform 96 generally parallel to the base 92. Platform 96 has two arms 97 comprising a groove cover 102 above parallel grooves 100 for receiving tray/plate rails such as handle engaging rails 78 shown in FIG. 5. A pin 70 can be received, for instance, in a cup holder adaptor 30 upper bore 50 or lower bore 52, and riser 94 defines parallel bores 98 also adapted to receive pins 70.

The tray/plates 32 and 34 can be used with the handle 38 (shown in FIG. 6) for any occasion involving standing and eating or as a lap tray when sitting and eating without a table.

Figure 8:
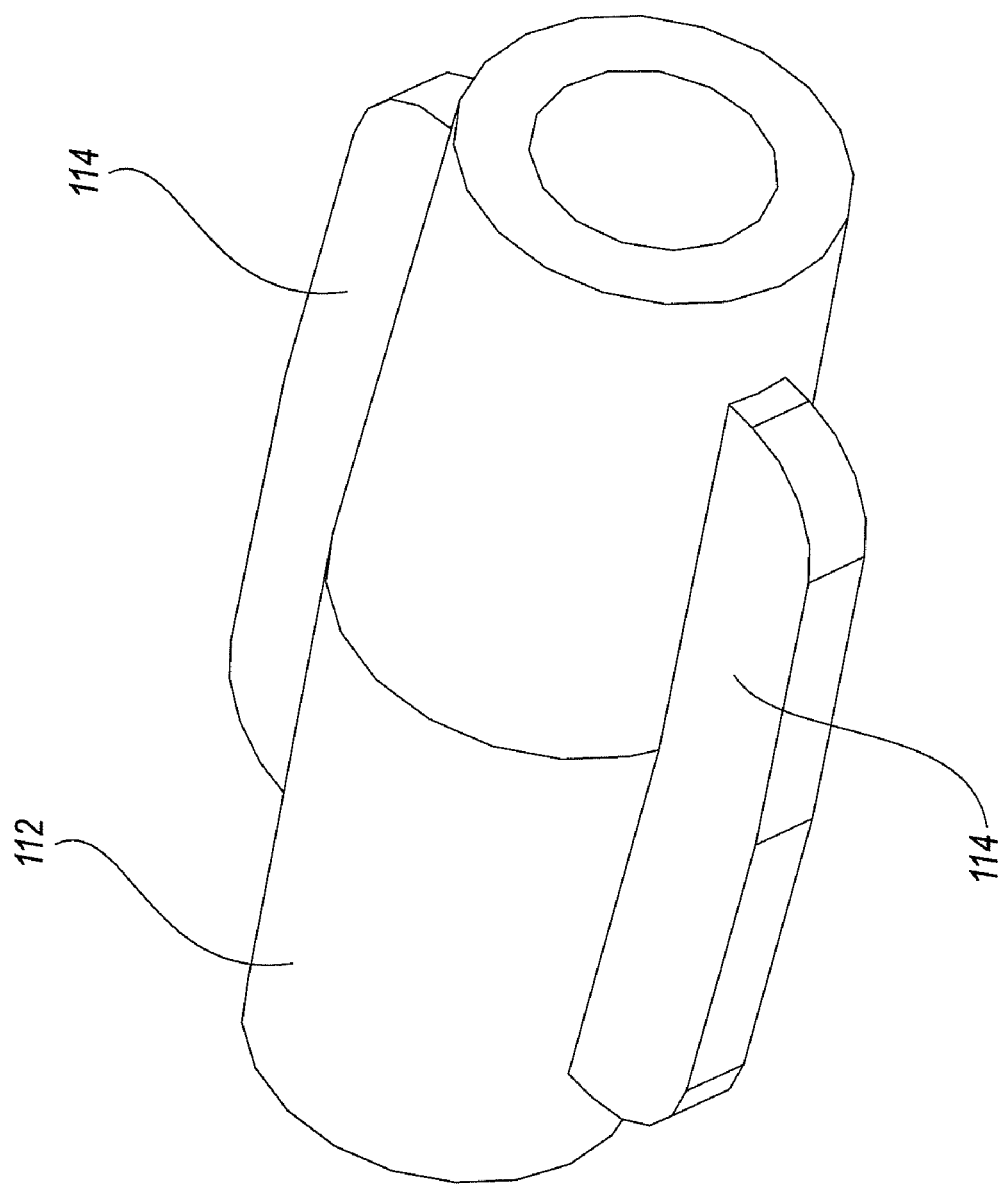
FIG. 8 is a turn buckle for use with the cup holder adaptors of this invention.
Figure 9:
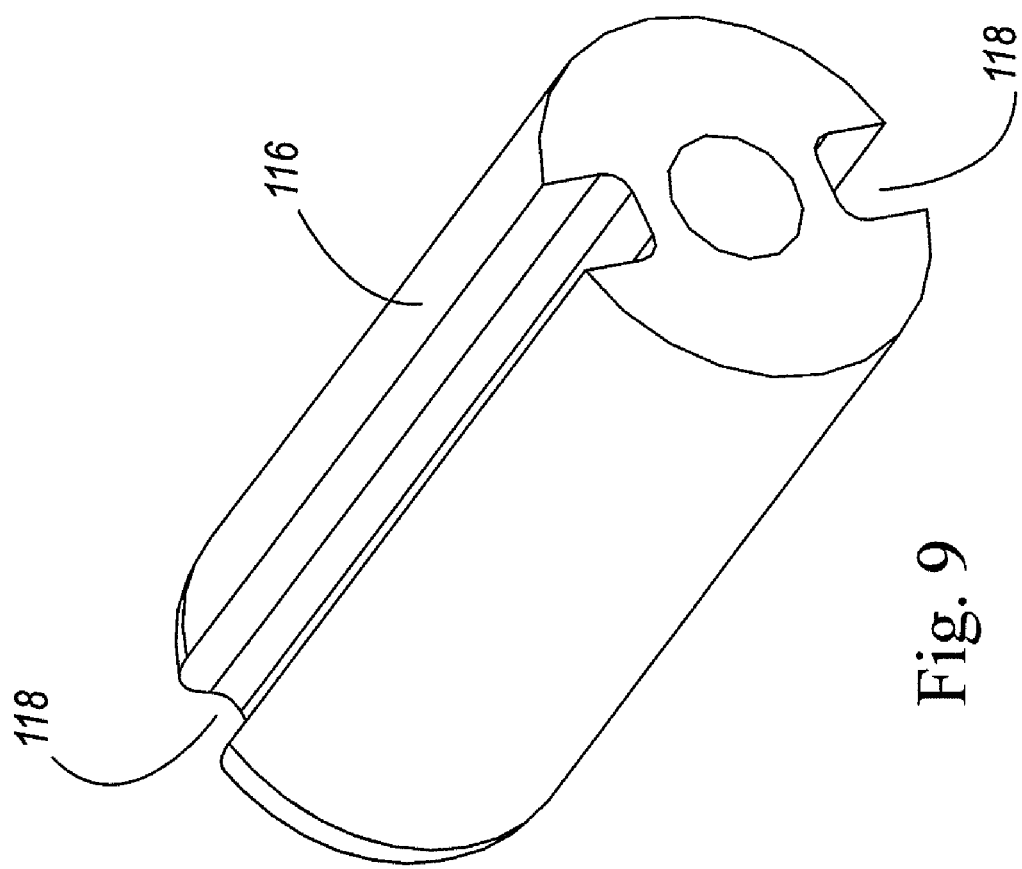
FIG. 9 is a perspective view of an inner rod or turn buckle barrel for the turn buckle of this invention.
Figure 10:
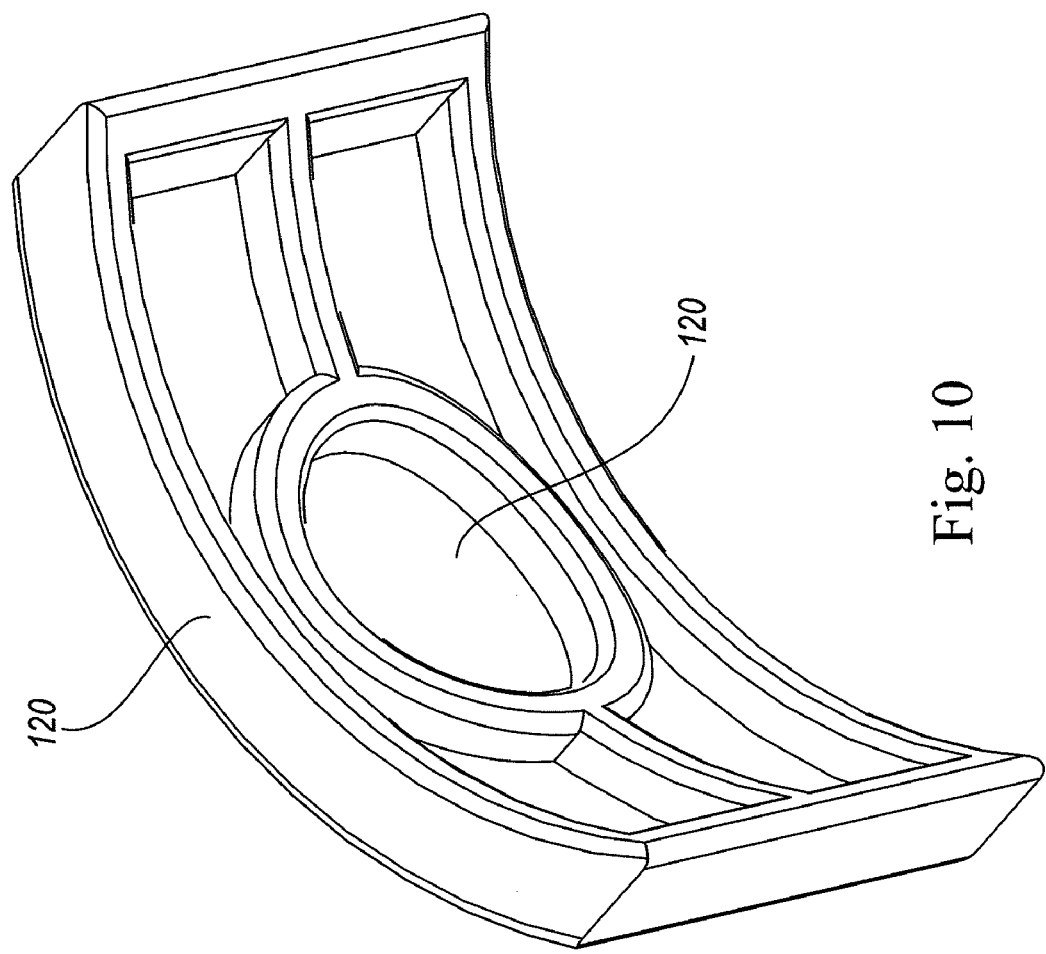
FIG. 10 is a perspective view of a gap filler for cup holders having a gap in their side wall.
Figure 11:
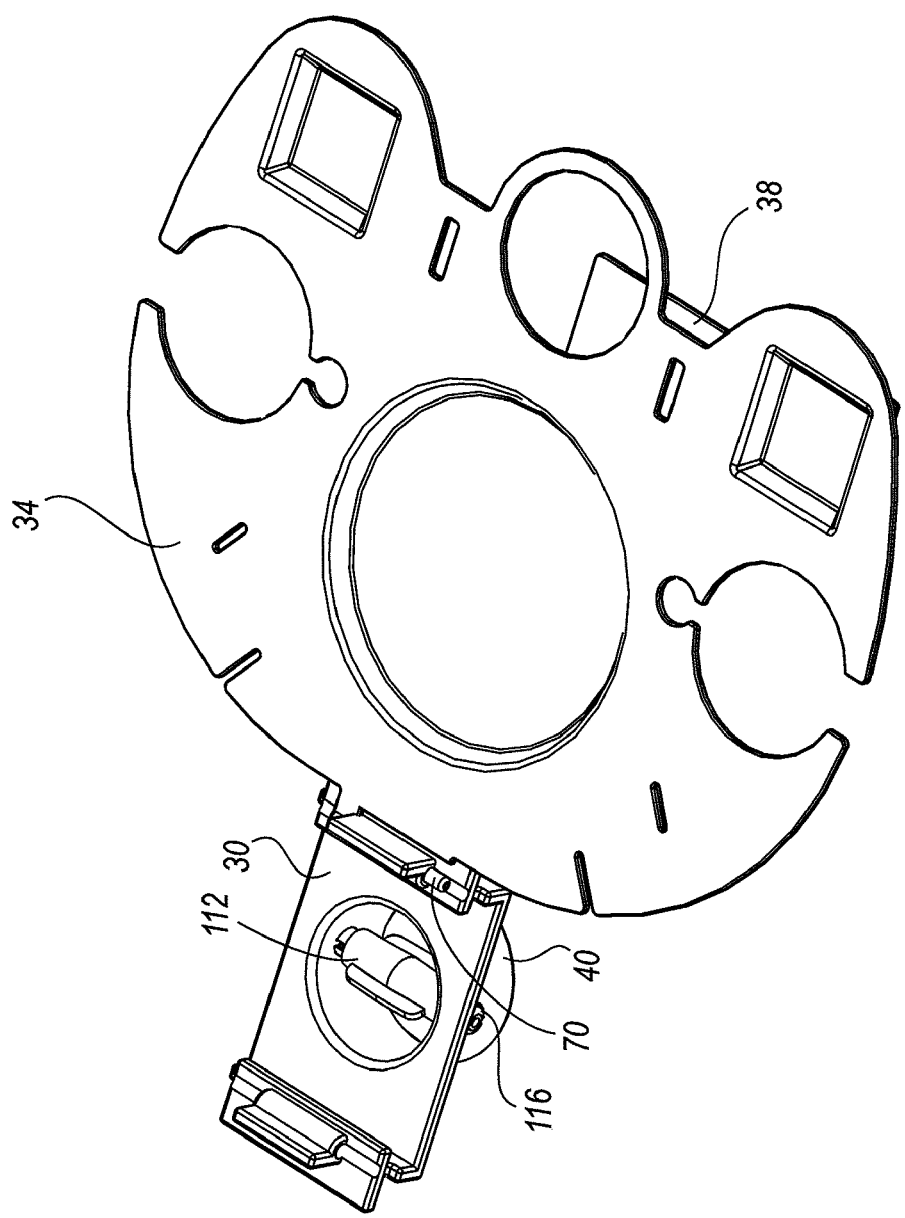
FIG. 11 is a perspective view of the second embodiment of the tray/plate of this invention (shown in FIGS. 4 and 5) attached to the embodiment of cup holder adaptor of this invention shown in FIG. 1.
Figure 12:
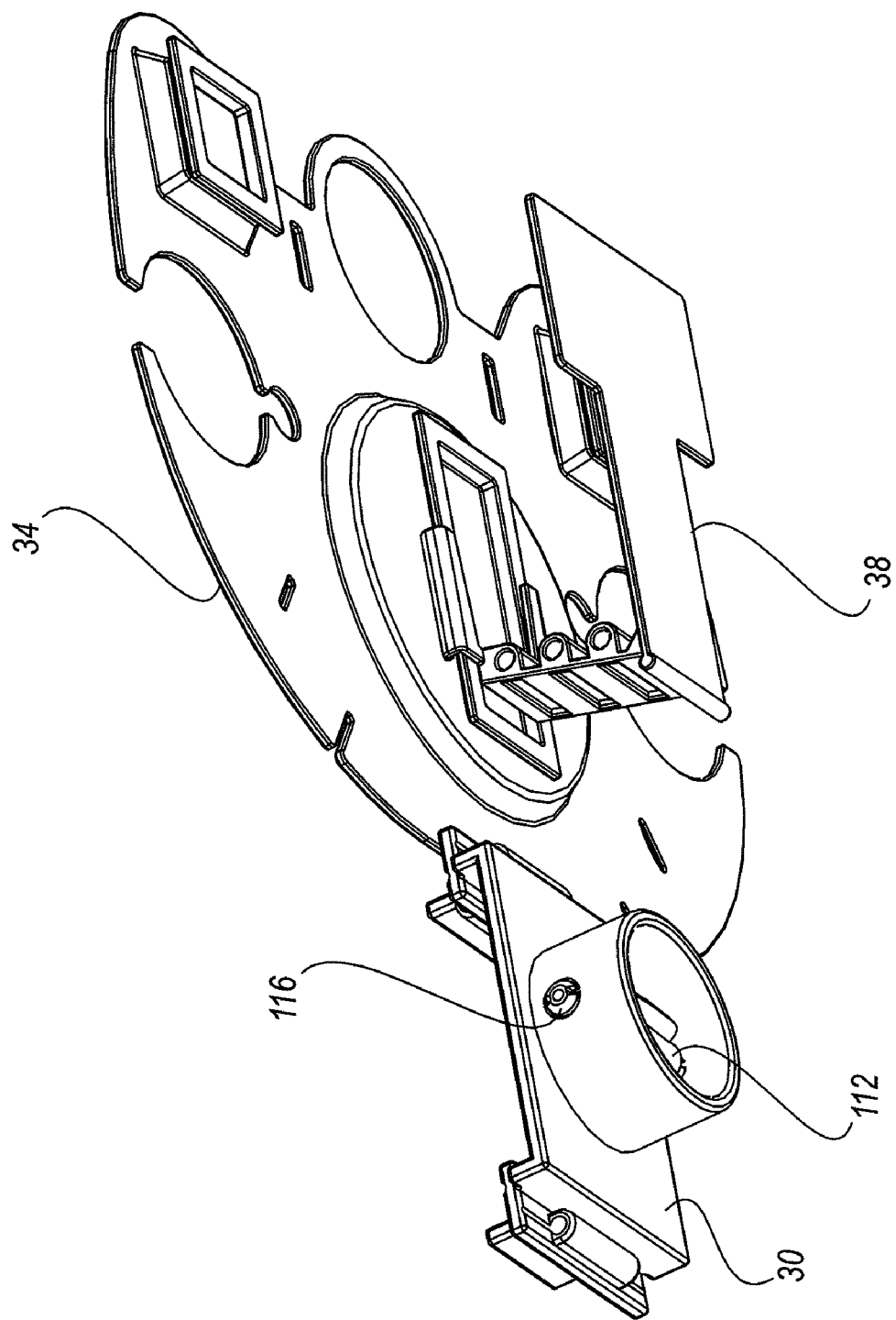
FIG. 12 is a bottom perspective view of the embodiments of the present invention shown in FIG. 11.

A turn buckle 112 shown in FIG. 8 having wing 114 may be used to lock cup holder adaptor 30 within a vehicle cup holder as is depicted in FIG. 11. Tray/plate holder 34 is shown attached to cup holder adaptor 30 by inserting pin 70 in bore 50 in adaptor 30. The handle 38 only partially visible in FIG. 11 can be more clearly seen in FIG. 12 that depicts attachment of handle 38 to tray/plate 34.

Figure 13:
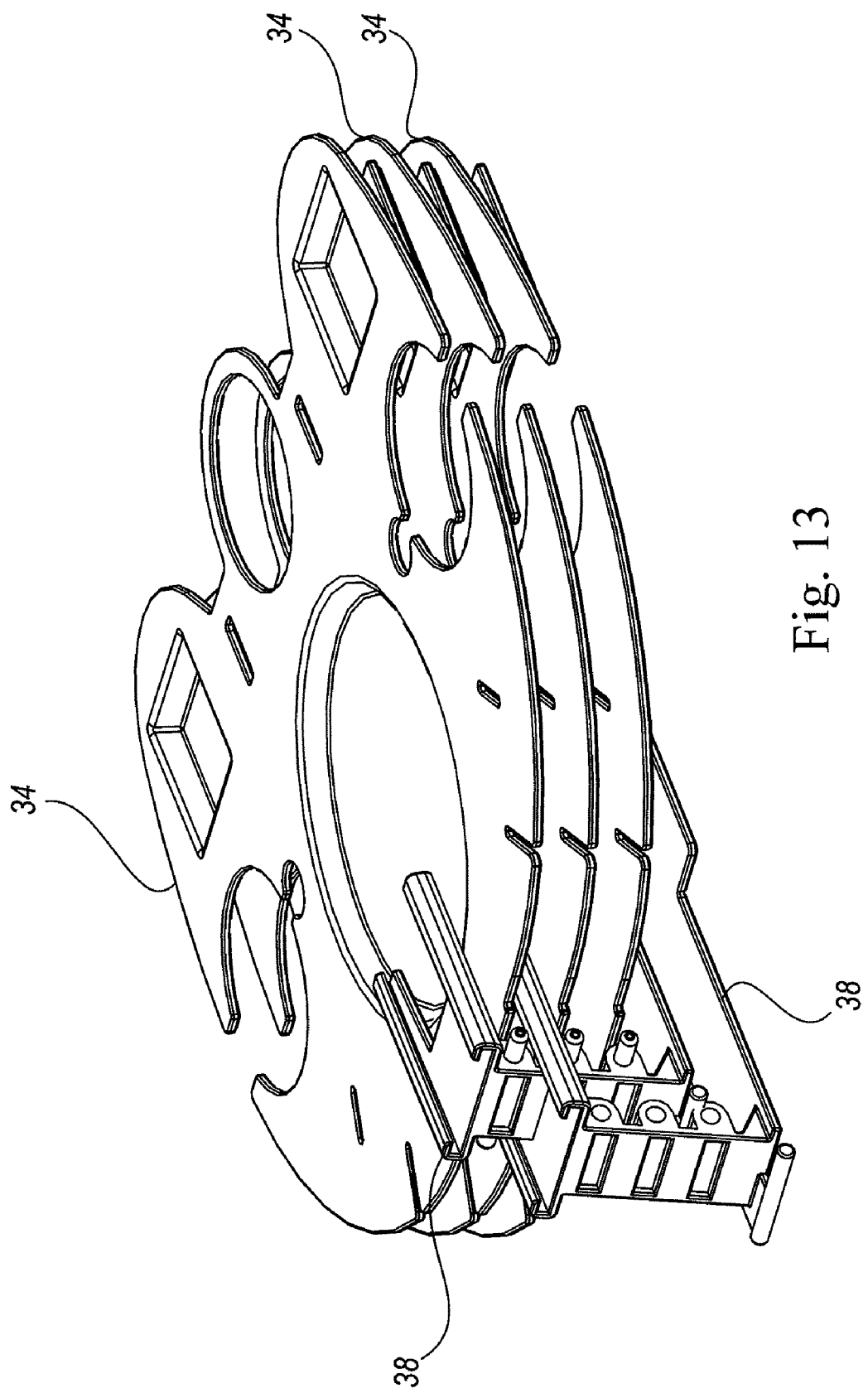
FIG. 13 is a perspective view of nested support handles and tray/plates of this invention.
Figure 14:
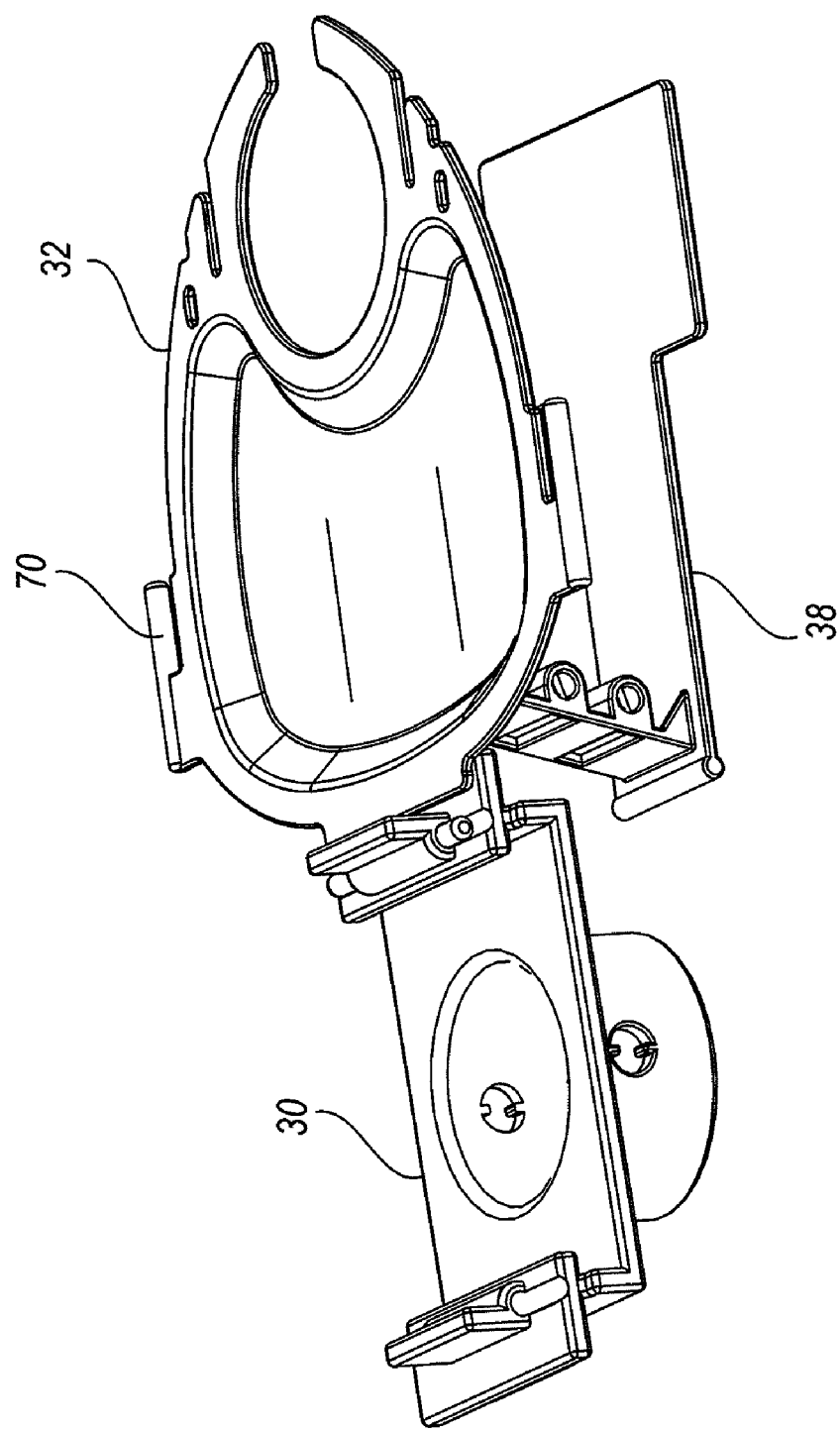
FIG. 14 is a perspective view of the first embodiment of the tray/plate of this invention attached to one embodiment of the cup holder adaptor of this invention and one embodiment of a support handle of this invention.

Nesting of support handle 38 and tray/plate 34 is depicted in FIG. 13. An alternative configuration of exemplary embodiments of the components of the present system is depicted in FIG. 14, which shows a support handle 38 attached to a single cup/tray/plate 32 that is, in turn, attached to adaptor 30 by insertion of one of the attachment pin 70 in one of the bores 50 in adaptor 30.

Figure 15:
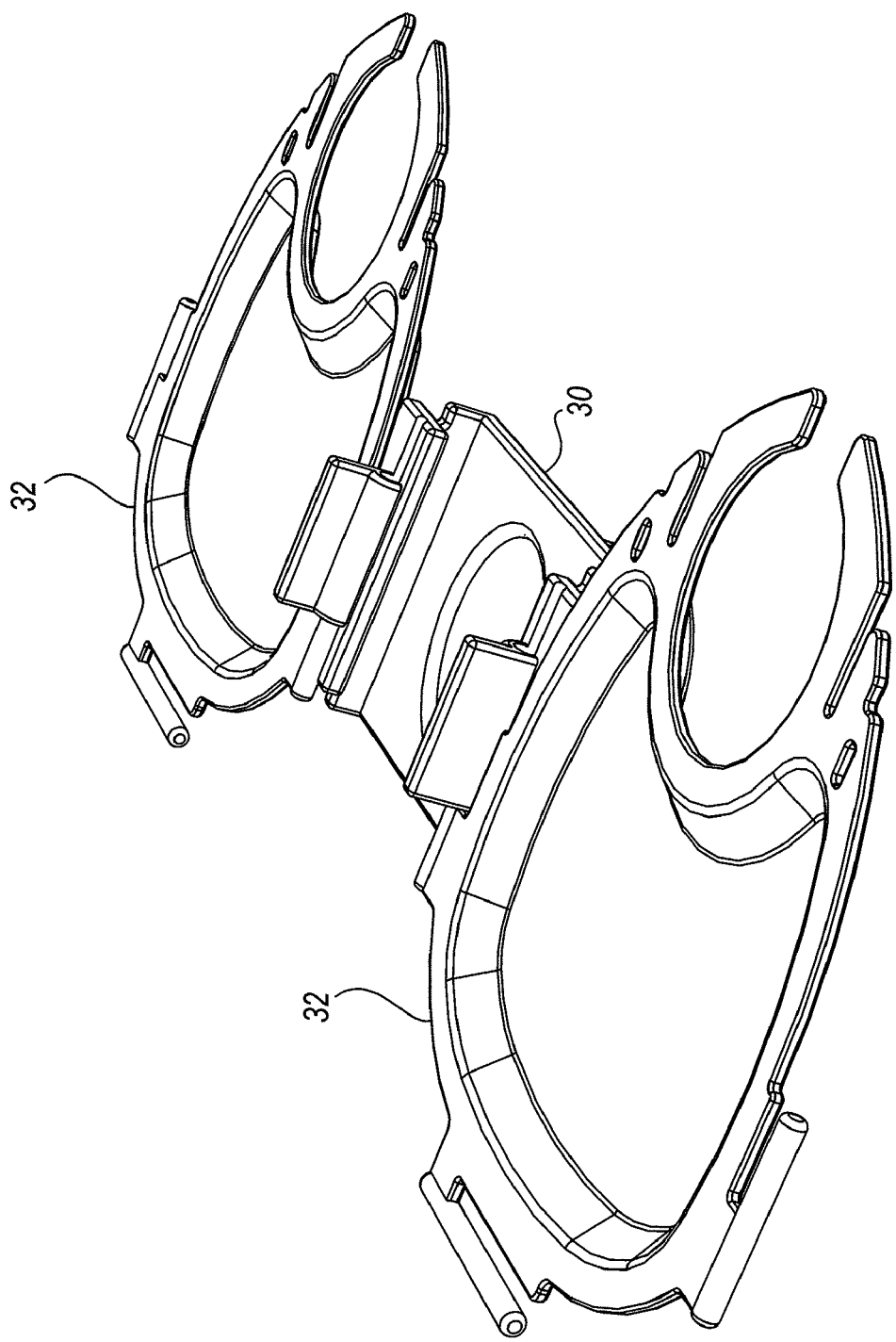
FIG. 15 is a top perspective view of the cup holder adaptor of this invention shown in FIG. 1 together with two of the first embodiment of the tray/plate components of this invention shown in FIG. 2.

Attachment of two single cup holder tray/plates 32 to an adaptor 30 utilizing side pins 70 of tray/plate 32 is depicted in FIG. 15.

Figure 16:
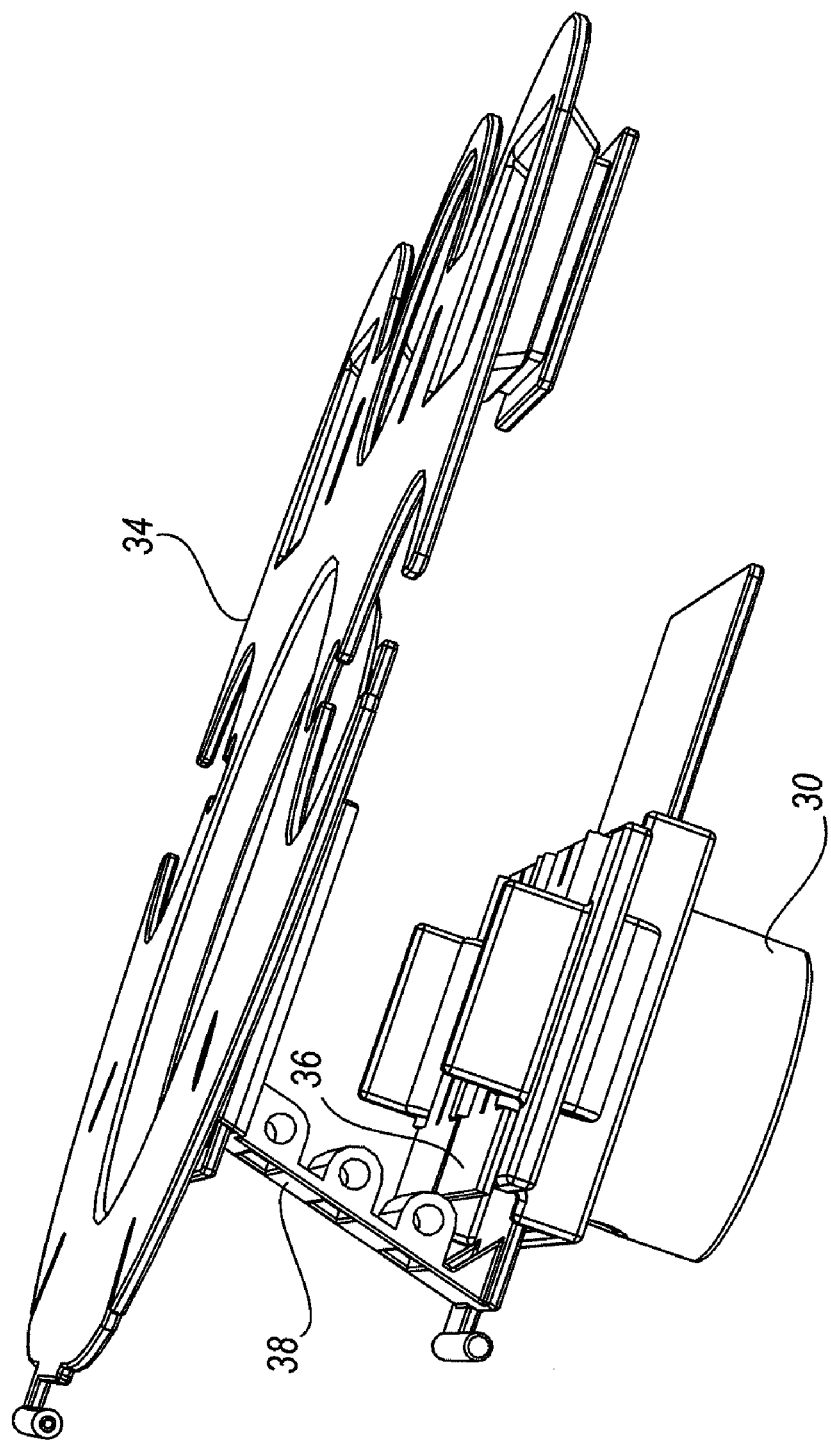
FIG. 16 is a perspective view of the side of an assembly of the second embodiment of the tray/plate of this invention mounted on a handle of this invention that is in turn mounted on the first embodiment of the cup holder adaptor of this invention shown in FIG. 1.

In another alternative configuration, depicted in FIG. 16, tray/plate 34 is attached to a handle 38, which, in turn, attaches to adaptor 30 by positioning base 92 on top of platform 42 and between uprights 44 of holder adaptor 30. Support wall 36 are attached to cup holder adaptor 32 but are folded down and not in use.

FIG. 17 depicts attachment of the tray/plate embodiment 34 to two support walls 36 by inserting tabs 110 through tab receiving slots 88 and engaging a portion of the tray/plate 34 in slots 108 in support wall 36.

Figure 20:
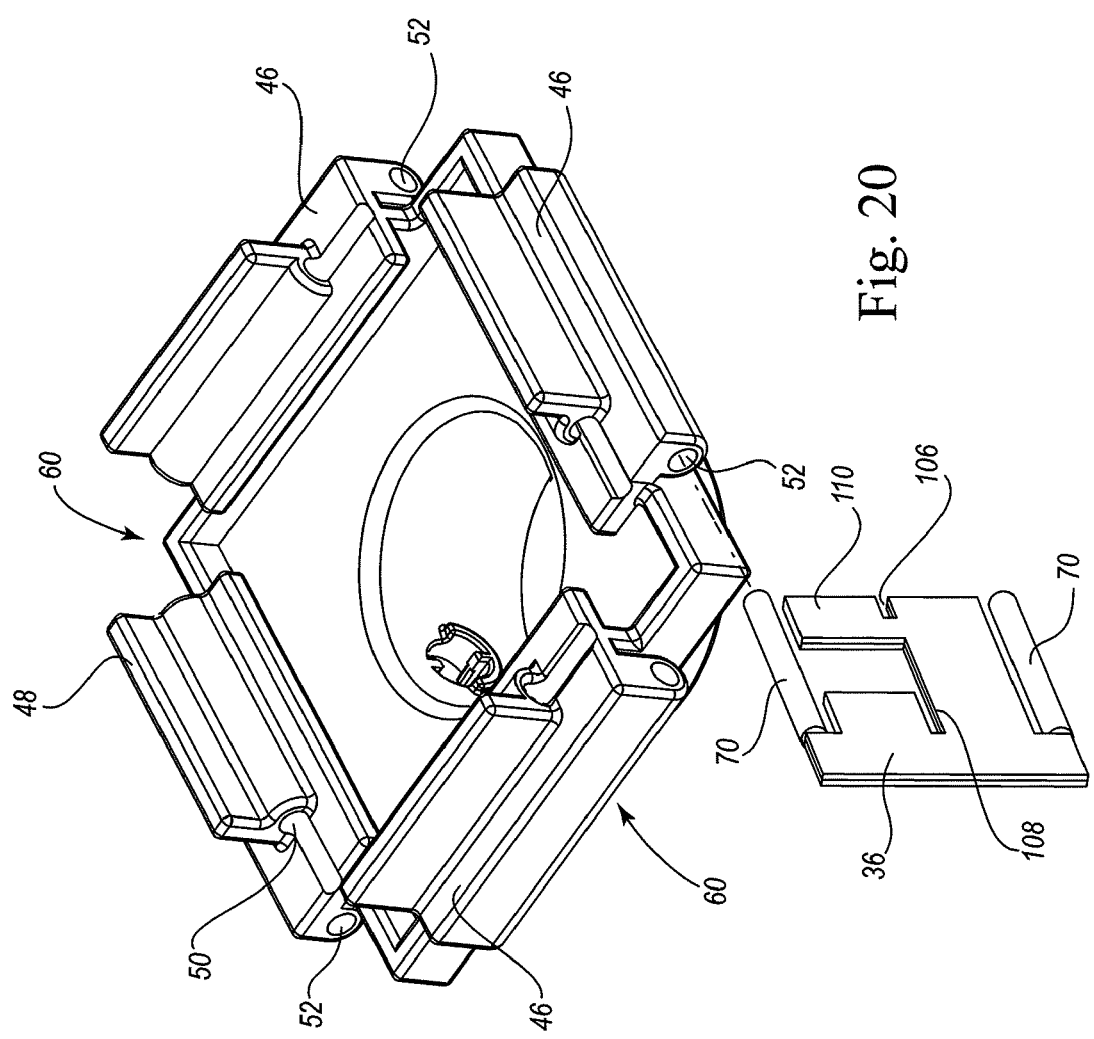
FIG. 20 is a perspective view showing attachment of the support wall of this invention showing in FIG. 7 to the cup holder adaptor shown in FIG. 20.

As will be appreciated by reference to all of the drawings in the above description, numerous alternative embodiments of the present invention are possible. One such embodiment of an alternative cup holder adaptor 60 is depicted in FIGS. 20 and 21. As may be seen by reference to those figures, platforms 46 and associated upper bores 50 and lower bores 52 are positioned on all four sides of the square cup holder adaptor 60.

The components of the multifunctional, reconfigurable vehicle food and beverage holders system for mounting in motor vehicle beverage holders of this invention can be molded or otherwise formed of plastic. Such plastic should have suitable stiffness, durability, strength, cost and other properties for these components, and such plastic may include fillers, reinforcement fibers or other components as appropriate. Pins 70 can be integrally formed or attached like or dissimilar materials, as appropriate in consideration of the cost, strength, manufacturing difficulty and other relevant factors. Sleeves can optionally be used in the bores to receive pins. Portions or all of the components can be machined, forged, stamped, cast, molded or otherwise formed of steel, aluminum or other metal alloys or other metallic materials and could be constructed of wood. System components can be coated, anodized, tempered, hardened or otherwise finished or treated as appropriate in light of the nature, properties and surface quality of the material from which the component is made.

The figures depict merely exemplary embodiments of this invention, which can be fabricated of numerous alternative materials and manufacturing techniques in myriad configurations. The figures well communicate the cup-holder engaging, component inter-connecting, and food and beverage accommodating configurations of this invention, enabling persons skilled in the relevant arts to practice this invention in both the illustrated and numerous alternative embodiments, all within the spirit of this invention and the scope of the following claims.

The invention claimed is:

1. A system for holding food and a beverage in a vehicle, the system comprising:
   a. a cup holder adaptor comprising:
      i. a tubular component for insertion into a vehicle cup holder, and
      ii. at least one support structure attached to the tubular component and configured for attachment to another component,
   b. a tray comprising:
      i. a generally planar structure having at least one recess for receiving and holding food and at least one opening for receiving and holding a beverage cup, and
      ii. attachment structure for attachment of the tray to the cup holder adaptor support structure,
   wherein one of the tray attachment structure and the cup holder adaptor support structure comprises a pin and the other of the tray attachment structure and the cup holder adaptor support structure comprises a bore sized to receive the pin.

2. The system of claim 1 wherein the cup holder adaptor further comprises two support structures attached on opposed sides of the cup holder adaptor.

3. The system of claim 1 wherein the cup holder adaptor further comprises four support structures are attached to the cup holder adaptor.

4. A system for holding food and a beverage in a vehicle, the system comprising:
   a. a cup holder adaptor comprising:
      i. a tubular component for insertion into a vehicle cup holder, and
      ii. at least one support structure attached to the tubular component and configured for attachment to another component,
   b. a tray comprising:
      i. a generally planar structure having at least one recess for receiving and holding food and at least one opening for receiving and holding a beverage cup,
      ii. attachment structure for attachment of the tray to the cup holder adaptor support structure, and
   c. a handle comprising a generally planar base attached by a riser to a platform adapted to be temporarily attached to an underside of the tray.

5. The system of claim 4, wherein the handle riser is not square to the platform or base to facilitate nesting of multiple handles.

6. The system of claim 4, wherein the handle riser further comprises at least one bore for receiving a pin.

7. A system for holding food and a beverage in a vehicle, the system comprising:
   a. a cup holder adaptor comprising:
      i. a tubular component for insertion into a vehicle cup holder, and
      ii. at least one support structure attached to the tubular component and configured for attachment to another component,
   b. a tray comprising:
      i. a generally planar structure having at least one recess for receiving and holding food and at least one opening for receiving and holding a beverage cup, and ii. attachment structure for attachment of the tray to the cup holder adaptor support structure, and c. a support wall comprising a generally rectangular, planar plate having four sides, at least one of which sides is penetrated by at least one slot and to which plate a pair of pins is attached on a pair of opposed plate sides.

8. A system for holding food and a beverage in a vehicle, the system comprising:
   a. a cup holder adaptor comprising:
      i. a tubular component for insertion into a vehicle cup holder, and
      ii. at least one support structure attached to the tubular component and configured for attachment to another component,
   b. a tray comprising:
      i. a generally planar structure having at least one recess for receiving and holding food and at least one opening for receiving and holding a beverage cup, and
      ii. attachment structure for attachment of the tray to the cup holder adaptor support structure,
wherein the cup holder adaptor support structure:
   a. comprises a generally horizontal tray support from which an upstanding tab protrudes and
   b. is penetrated by at least one generally horizontal bore adapted to receive a pin.

9. The system of claim 8, wherein the cup holder adaptor support structure is penetrated by at least two generally horizontal bores adapted to receive pins.

10. A system for holding food and a beverage in a vehicle, the system comprising:
   a. a cup holder adaptor comprising:
      i. a tubular component for insertion into a vehicle cup holder,
      ii. a locking component for temporarily locking the adaptor in the vehicle cup holder, and
      iii. at least two support and attachment structures attached to the tubular component and configured for attachment to another component,
   b. two trays, each comprising:
      i. a generally planar structure having at least one recess for receiving and holding food and at least one opening for receiving and holding a beverage cup, and
      ii. attachment structure for attachment of the tray to the cup holder adaptor support structure,
wherein each tray attachment structure comprises a pin and each cup holder adaptor support and attachment structure comprises a bore sized to receive one of the pins and a support surface for supporting contact with the tray/plate near the pin.

11. A system for holding food and a beverage in a vehicle, the system comprising:
   a. a cup holder adaptor comprising:
      i. a tubular component for insertion into a vehicle cup holder, and
      ii. at least one support structure attached to the tubular component and configured for attachment to another component,
   b. a tray comprising:
      i. a generally planar structure having at least one recess for receiving and holding food and at least one opening for receiving and holding a beverage cup, and
      ii. attachment structure for attachment of the tray to the cup holder adaptor support structure,
wherein each cup holder adaptor support structure further comprises an upstanding tab adjacent to the bore to facilitate manipulation of the tray/plate and cup holder adaptor when attaching them to each other.

* * * * *